United States Patent Office.

JONATHAN SMITH, OF LANGLEY HOUSE, AND PHILIP WINTER NICOLLE, OF PORTLAND PLACE, ISLAND OF JERSEY, ENGLAND.

PROCESS OF BLEACHING FIBER.

SPECIFICATION forming part of Letters Patent No. 389,944, dated September 25, 1888.

Application filed August 31, 1887. Serial No. 248,402. (No specimens.) Patented in England December 31, 1884, No. 17,083.

*To all whom it may concern:*

Be it known that we, JONATHAN SMITH and PHILIP WINTER NICOLLE, residing, respectively, at Langley House and in Portland Place, both in the Island of Jersey, merchants, subjects of the Queen of Great Britain, have invented a certain new and useful Process for Separating the Extraneous Matters from and Bleaching Vegetable Fibers, (for which we have received Letters Patent in England, No. 17,083, dated December 31, A. D. 1884;) and we do hereby declare that the following is a full, clear, and exact description of the invention, which will enable others skilled in the art to which it appertains to make and use the same.

Heretofore it has been the custom when it has been necessary to use artificial methods of a chemical nature to effect the separation of the extraneous matters—*i. e.*, the natural gums, resins, coloring-matters, and the like—from vegetable fibers and the bleaching of the latter to soak the vegetable growth to be operated on in strong alkaline solutions—for instance, solutions of caustic potash. These solutions have easily dissolved the said extraneous matters, leaving the vegetable fibers free therefrom; but they have also had the effect upon the individual fibers of making them brittle, and therefore unsuitable for being spun into cords or ropes or woven into fabrics, for the production of which tenacity in the raw material thereof is essential.

The object of our invention is to separate the natural gums, resins, coloring-matters, and the like from vegetable fibers, and to bleach the latter expeditiously and without diminishing the natural tenacity of the individual fiber or rendering them brittle or liable to break when they are either spun or woven.

To this end, therefore, our invention consists in using solutions of any of the alkaline sulphates, or of any of the double alkaline sulphates, or compound solutions of any two or more of the said sulphates, in which the vegetable growth is soaked for the purpose of effecting the separation of the said extraneous matters by a process of dissolution from the fiber. We then under certain circumstances follow up such soaking by a second one in a solution of chloride of lime for the purpose of effecting the bleaching of said fibers.

We adduce china-grass as an instance of an otherwise valuable vegetable fiber being seriously damaged by immersion in alkaline solutions of too strong a causticity. The fibers of the grass are cleaned and bleached by the use of these solutions, but they are at the same time rendered so brittle that they cannot be woven by themselves, but only when mixed with a large proportion of animal fiber.

Our invention is applicable to any vegetable growth containing fibers.

In carrying it into effect we prepare a separating-solution of any alkaline sulphate (by preference sulphate of potash) in water of from two per cent. to four per cent. strength—*i. e.*, from two to four pounds of the sulphate to one hundred pounds of water.

The vegetable growth in its natural condition is soaked in the above solution for a longer or shorter time, as may be required to dissolve the natural gums, resins, coloring-matters, and the like. The duration of this operation is considerably influenced by the temperature of the solution. As a rule, a soaking of twenty-four hours duration in a cold solution suffices for the complete solution of the various extraneous matters—natural gums, resins, coloring-matters, and the like—and their separation from the fibers. If an obstinate vegetable growth—*i. e.*, one heavily charged with gum and color—has to be treated, then the process of solution and separation of the latter will be expedited by using the solution hot, and further expedited by conducting the process under pressure. When all the natural gums, resins, and coloring-matters have been separated from the fibers by the separating-solution, the fibers are taken out and carefully subjected to any suitable mechanical operation—*e. g.*, pressing, rolling, or rapid rotation—suitable for expelling as much of the solution, and all it then holds in solution or in suspension, from said fibers, as is possible. Care must be taken in conducting this part of the process that the individual fibers are not injured by being subjected to too severe a pressure. The fibers are next washed in water and left to soak for some time. They are next dried, and are then ready for being bleached, which is effected as next described.

We prepare a solution in water of chloride of lime and sulphate of potash, six parts, by weight, of the chloride of lime to five parts, by weight, of the sulphate of potash, in which the dried fibers are soaked for a suitable time. The above proportions may be varied as may be found more suitable for the particular fiber under treatment.

The two operations of separation and bleaching may be amalgamated by using a solution of twelve parts, by weight, of sulphate of potash with five parts, by weight, of chloride of lime in water, instead of using two solutions—one of sulphate of potash, followed by one of chloride of lime.

These proportions may be varied if required by the special nature of the vegetable growth to be operated upon in respect of the quantity (more or less than the average) of the extraneous matters to be separated from the fibers.

The sulphate of potash may be replaced in any of the above-named solutions by any of the alkaline sulphates, or by a double alkaline sulphate, or by a mixture of them, or of any of them.

We do not confine ourselves to any specific form of plant in which the above-described process of separation and bleaching is to be carried on. Any suitable or convenient plant may be used, and, if desired, any suitable decorticating machinery may be combined with the tanks containing the above-specified solutions.

We are aware that alkaline sulphates have been used in bleaching compositions, and we therefore lay no claim to such use generally.

Having fully described our invention, what we desire to claim and secure by Letters Patent is—

1. The process of separating the natural gums, resins, coloring-matters, and the like in any vegetable growth from the fibers thereof, consisting in immersing the said vegetable growth in a solution of an alkaline sulphate, and subsequently removing the said solution and all it then holds in solution or in suspension from the said fibers, as described.

2. The process of separating the natural gums, resins, coloring-matters, and the like in any vegetable growth from the fibers thereof, consisting in immersing the said vegetable growth in a solution of one or more alkaline sulphates, either single or double, or both, or a mixture of either or both, and subsequently removing the said solution and all it then holds in solution or in suspension from the said fibers, as described.

In witness whereof we have hereunto set our hands this 10th day of August, 1887.

JONATHAN SMITH.
PHILIP WINTER NICOLLE.

Witnesses:
H. GELA TASTE,
PHIL. LE MAISTRE, Jr.,
   *Both of* 12 *Hill St., Jersey.*